Nov. 10, 1953  I. KALIKOW  2,658,361
DRIVING MECHANISM
Filed Feb. 2, 1950
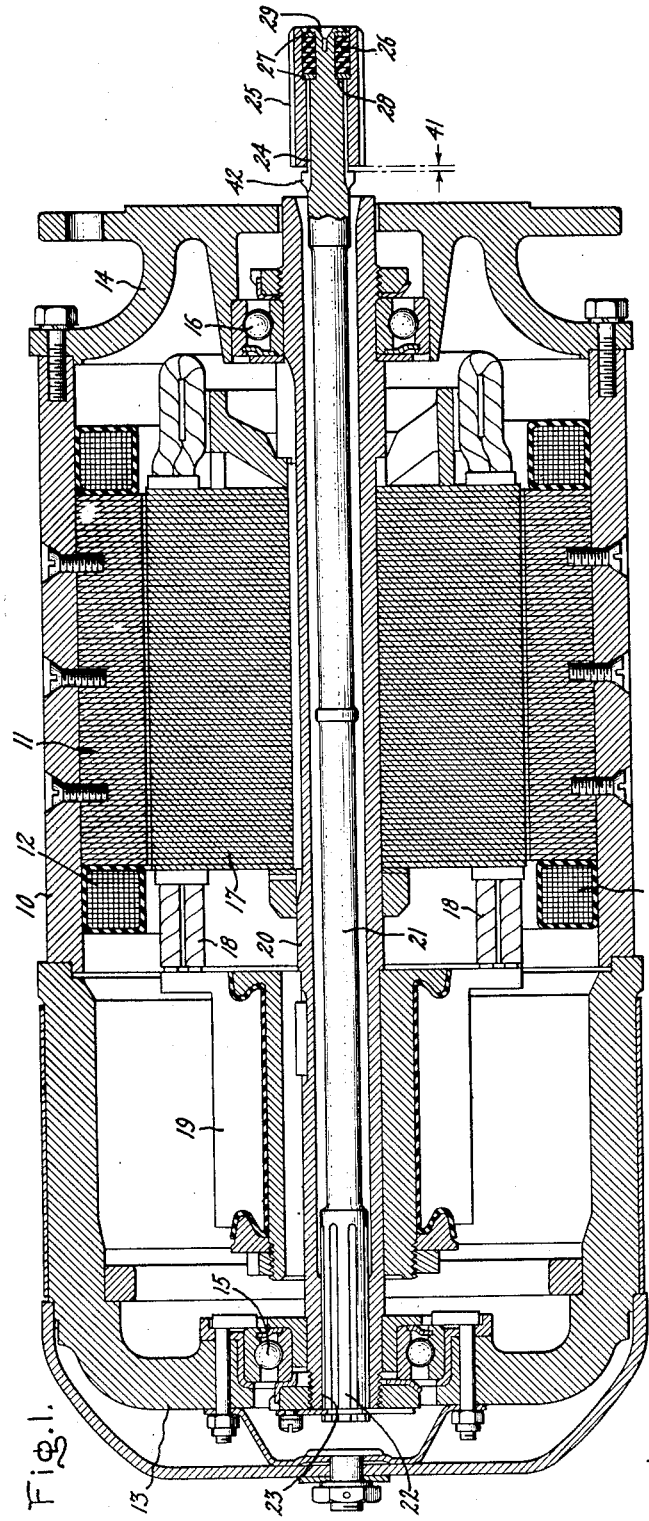
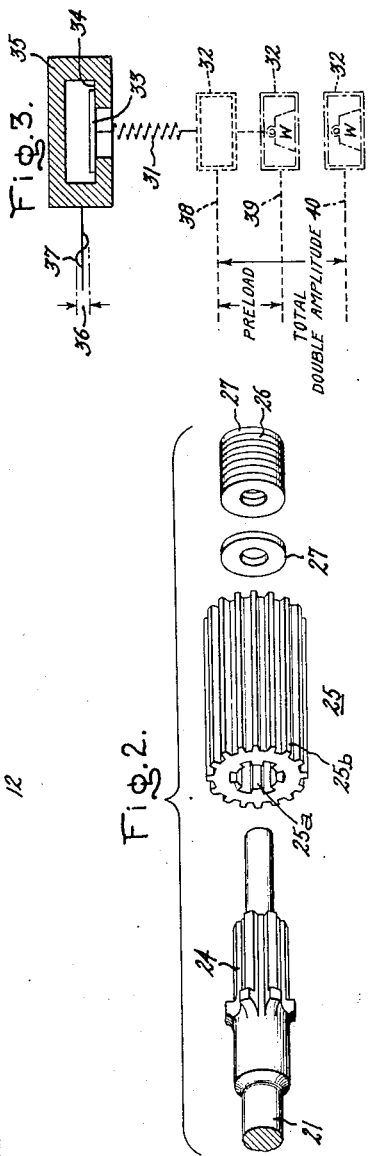
Inventor:
Irving Kalikow,
by Ernest H. Britton
His Attorney.

Patented Nov. 10, 1953

2,658,361

UNITED STATES PATENT OFFICE 2,658,361

DRIVING MECHANISM

Irving Kalikow, Swampscott, Mass., assignor to General Electric Company, a corporation of New York Application February 2, 1950, Serial No. 142,053

4 Claims. (Cl. 64—1)

My invention relates to driving mechanisms and in particular to an arrangement of a clearance type drive for absorbing torsional and axial vibrations which may be transmitted from a driving to a driven member.

Heretofore, it has been known to employ torsional shafts such as an aircraft generator inner shaft firmly coupled at one end to a driving source such as an aircraft engine and at the other end through a concentric quill shaft to a mass such as the generator armature. With such an arrangement, there is often thought to be a critical frequency at which the whole system will torsionally respond and at which a small input torsional vibration will result in very large torsional vibration amplitudes of the driven mass. Such generators are preferably of small size and light weight and where the prime mover is of the reciprocating type, such shafts and associated parts must be adapted to absorb the tremendous oscillating forces built up by the intermittent firing within the various cylinders of the prime mover. Even with small amplitude input, the shaft is likely to break after a short time unless some means is used to limit the resulting amplitudes at critical frequency. It has been known to use friction dampers to provide a mechanically parallel circuit (between driving and driven member) to absorb the vibration energy, but in certain applications such dampers have been disadvantageous in that they are costly and add considerably to the weight and inertia of the system.

It is an object of the present invention to provide simple and inexpensive means for overcoming the above-mentioned difficulties.

Another object of my invention is to provide a clearance type flexible drive utilizing a torsion rod and having adequate absorption of both axial and torsional vibrations.

A still further object of the present invention is to provide novel means for absorbing, limiting, and dissipating increments of torsional vibration energy input to prevent the building up of large amplitudes of torsional vibration in a rotating body.

In the illustrated embodiment of the invention, the means employed are shown applied to an aircraft generator rotor adapted to be driven by an aircraft power plant. To save axial space, the rotor is mounted on a stiff tube or quill shaft splined at one end to an inner or torsion shaft. At the opposite end, the inner shaft is splined to loosely engage a plurality of splines on the inner periphery of an engine engaging sleeve with a torsional clearance substantially greater than the maximum expected torsional vibration, and sleeve and shaft are held in axial alignment by soft rubber which may be bonded or otherwise secured to the parts to absorb axial vibration without affecting absorption or limitation of torsional vibration through the clearance because the resilience of the rubber is so great compared to that of the steel parts that it offers essentially no resistance, its lack of effect torsionally being comparable to that of air, or a vacuum.

Further objects and advantages will become apparent and my invention will be better understood from consideration of the following description taken in connection with the accompanying drawing in which Fig. 1 is a longitudinal cross-sectional view through an aircraft generator provided with a driving mechanism embodying my clearance type flexible drive; Fig. 2 is an exploded perspective view showing the engine engaging sleeve used in the drive of Fig. 1 and the elements cooperating therewith; and Fig. 3 is a schematic representation of a simplified linear motion mechanical equivalent to illustrate the operation of the torsional clearance type flexible drive illustrated in Figs. 1 and 2.

Referring now to the drawings, Fig. 1 is a longitudinal cross-sectional view through a dynamoelectric machine, such as an aircraft generator, provided with a stationary member 10 having a magnetic field structure 11 adapted to be excited by a field exciting winding 12 and provided with end shields 13 and 14 having bearing housings in which antifriction bearings 15 and 16, respectively, are arranged for supporting a rotatable member. As shown, the rotatable member comprises an armature having a core of magnetic material 17 with an armature winding 18 arranged in winding slots therein and connected to a commutator 19, all of which are mounted on a quill shaft 20 adapted to be driven by any suitable prime mover through a torque rod 21 which, together with its connections at one end to the quill shaft 20 and at the other to the prime mover (not shown), forms a flexible drive for partially minimizing the transmission of oscillations from the prime mover to the rotatable member of the machine. The torque rod 21 is formed with splined connection sections at both ends thereof, and one of these sections 22 closely engages a complementary inner splined connection 23 on the quill shaft 20 to provide a direct mechanical driving connection therebetween. The other end of the torque rod 21 is formed with a splined connection section 24 which is adapted to provide a loose fit (as hereinafter more fully described) within a complementary splined sleeve 25 for connecting the torque rod 21 to an aircraft engine or other prime mover. Thus, at the engine engaging end there is a relatively large torsional clearance. As a matter of fact (and as hereinafter explained in connection with Fig. 3), I have found it desirable to make this clearance about three times the maximum engine torsional vibration. Thus, if the maximum prime mover torsional vibration is 1°, the sleeve and shaft spline engagement should be so proportioned that ±3° of torsional clearance is obtained.

As shown most clearly in Fig. 2, the shaft 21 may be provided with six external splines (24) and the sleeve 25 provided with six mating internal splines (25a), it being assumed that, as stated above, there is a clearance fit of at least three times expected torsional vibration amplitude between these splines. Sleeve 25 is also provided with external splines 25b adapted to engage complementary splines on a rotating part of the prime mover engine (not shown). The sleeve 25 and the shaft 21 are held in substantial axial alignment by a plurality of rubber washers 26. In order to keep the rubber washers from deforming into the splines (or at the opposite end) and also in order to preload the rubber so that it firmly grips the mating parts, a steel washer 27 is used at each end of the stack of rubber discs. The assembly of washers are then forced against shoulders (such as shaft shoulder 28) by any convenient means such as by the peened over flange 29 on shaft 21 at the extreme end of the washers. As already stated, the rubber washers are not intended to, and for all practical purposes do not serve to absorb or transmit a portion of the steady or vibrational torsion torques when the splines are out of contact, and they are provided (if desired) merely to absorb the relatively much smaller axial vibration forces and to hold the parts together axially which, of course, could be done in other ways without departing from the true spirit and scope of my invention.

It is believed that the operation of the clearance type flexible drive illustrated in Figs. 1 and 2 can best be understood by reference to Fig. 3 illustrating a vibrating system having a spring 31 supporting a box 32 (assumed to be weightless) with the spring supported from a disk 33 resting on shoulders 34 of a limited clearance collar 35 to which a vibrating input (as indicated by arrows 36 and wave form 37) is adapted to be applied. In accordance with the invention, if the amplitude of the input (36 and 37) is assumed equal to one linear unit, the clearance within collar 35 should be at least 3 linear units.

Assuming for the moment that the vibrating input is not yet applied, when box 32 is empty there is no preloading of the spring and the position of the box may be indicated by a line 38. If, then, a weight W is placed inside the box, the spring restrained box will lower to a line 39 where the distance 38—39 represents the preloaded extension of the spring. For any simple harmonic motion, the amplitude above and below the equilibrium position is equal, and this means that the maximum extension of the spring when the input is applied and even at critical frequency will not allow the loaded box 32 to fall below a line 40 where the distance from line 40 to line 39 is the same as the preload extension distance from line 38 to line 39. This is so because the vibrating box cannot go higher than line 38 without forcing disk 33 up off of its seat so that by reason of this momentary disconnection no energy can be fed into the system and the vibration will tend to die down. The analogy between Figs. 1 and 3 is further apparent in that the viscosity of air within collar 35 is so small compared to the effect of spring 31 that it has practically no effect, just as the elastic force of washers 26 is so low compared to the stiffness of shaft 21 that even if the rubber is bonded to the parts it will offer essentially no resistance to torsional displacement of the shaft.

The scheme of the invention makes possible a driving mechanism having substantially no critical frequency at no load, and when preloaded the vibration is limited to twice the preloading shaft twist. The designer generally knows the torsional vibration amplitudes of a driving member (usually less than ±1° for a multi-cylinder internal combustion engine) and therefore it is possible to design the shaft safely without the employment of a vibration damper such as is usually provided in mass spring systems. With underloading (such as when the generator of Fig. 1 is excited but delivering no current), the system may be mechanically excited at its torsional critical frequency, but the total double amplitude vibration at this critical frequency can never be more than twice the shaft twist due to the load which would be very low indeed. Likewise, under full load, the shaft may be pretwisted (say, for example, 5 angular degrees), and when the system is excited at its torsional critical frequency, the resulting total double amplitude twist of the shaft will never be more than twice the preload twist (i. e., for example, a total of 10° vibration amplitude will result). The torsional shaft may be readily designed to last indefinitely when oscillating no more than this total double amplitude. Since any motion beyond this amplitude would disturb the time phase sequence and cause the system to fall out of resonance, it will stay limited to no more than twice the amplitude of preload. It is to be understood that the words "preload" and "pretwist" as used above refer to the steady state load and shaft twist which are assumed to exist before the oscillations are considered. As already described, the rubber discs are so held that sleeve 25 may move torsionally within the splined clearance limits on shaft 21, and also, the sleeve 25 may (by deflecting the rubber discs) move axially inward up to the limit of a clearance 41 provided between sleeve 25 and a shoulder 42 on shaft 21. Also, the sleeve may move axially outward by further compressing the rubber. This is important under conditions of engine drive axial vibration. Even in severe cases this axial movement will be only a few thousandths of an inch, but without the rubber or some similar resilient holding material, such axial vibration would cause spline wear and greatly increase vibration forces transmitted to the generator.

A clearance of at least three times as large as the amplitude of the input torsional vibration assures that no contact will be made on the normally trailing faces when the spring shaft begins to oscillate, while at the same time the described construction is relatively simple to make and compared to conventional friction damper designs will afford a great saving in cost and in weight and inertia, with the saving in inertia resulting in longer life of the parts.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A clearance type flexible drive for an aircraft generator rotor adapted to be driven by an aircraft engine, said drive comprising a quill shaft on which said rotor is mounted to be driven thereby, a torque rod arranged concentrically within said quill shaft, means providing a direct mechanical connection between said quill shaft and said torque rod at one end of said rod, an engine engaging sleeve at the opposite end of said torque rod and arranged concentric therewith and splined thereto with the splines of said sleeve and the splines of said rod providing a large torsional clearance to limit the amplitude of torsional vibrations, and resilient means interposed between said sleeve and said rod for absorbing axial vibrations.

2. A clearance type drive including a torque rod, a quill shaft arranged around said torque rod and fastened thereto at one end thereof, a drive engaging member surrounding said torque rod at the opposite end thereof, means coupling together said drive engaging member and said torque rod comprising loosely mating splines on said torque rod and said drive engaging member respectively, said mating splines providing a torsional clearance which will allow said torque rod and quill shaft to oscillate through a total maximum amplitude of twice their pretwist at critical frequency, and means including cushioning washers of resilient material interposed between said drive engaging member and said torque rod for absorbing axial vibrations.

3. An aircraft generator adapted to be driven by a reciprocating type engine and having the combination of an inner shaft and an outer quill shaft concentric therewith, said generator having a rotor core mounted on said quill shaft for rotation therewith, said shafts having first and second ends and being coupled together at said first end thereof without being connected together at said second end thereof, a sleeve surrounding said inner shaft at said second end and adapted to engage said engine to be driven thereby, said sleeve and inner shaft having mating splines with the slots between splines of each of said members being sufficiently larger than the splines of the other of said members to provide a torsional clearance of at least three times the maximum amplitude of torsional vibration of said reciprocating type engine.

4. A clearance type flexible drive for a rotating mass adapted to be driven by a power source subject to torsional vibrations comprising a quill shaft on which said rotating mass is secured to be driven thereby, a resilient torque rod arranged concentrically within said quill shaft, means coupling together said quill shaft and said torque rod at one end of said torque rod, a drive engaging member concentrically arranged with respect to the other end of said torque rod to connect said torque rod to said power source, means coupling together said drive engaging member and said torque rod, one of said means comprising a splined connection with the mating splines thereof providing a large torsional clearance operable to disconnect momentarily said rotating mass from said power source to limit thereby the maximum amplitude of the vibrations of said rotating mass.

IRVING KALIKOW.

References Cited in the file of this patent

UNITED STATES PATENTS

| Number | Name | Date |
| --- | --- | --- |
| 993,570 | Webster | May 30, 1911 |
| 1,965,742 | Junkers | July 10, 1934 |
| 2,220,751 | Bergman | Nov. 5, 1940 |

FOREIGN PATENTS

| Number | Country | Date |
| --- | --- | --- |
| 406,934 | Germany | 1924 |